(12) United States Patent
Langner

(10) Patent No.: US 8,673,042 B2
(45) Date of Patent: Mar. 18, 2014

(54) FILTER ELEMENT AND FILTER DEVICE

(75) Inventor: Norbert Langner, Asperg (DE)

(73) Assignee: Mahle International GmbH (DE)

( * ) Notice: Subject to any disclaimer, the term of this patent is extended or adjusted under 35 U.S.C. 154(b) by 175 days.

(21) Appl. No.: 13/034,300

(22) Filed: Feb. 24, 2011

(65) Prior Publication Data

US 2011/0203240 A1    Aug. 25, 2011

(30) Foreign Application Priority Data

Feb. 25, 2010 (DE) .................... 10 2010 009 268

(51) Int. Cl.
*B01D 46/00* (2006.01)

(52) U.S. Cl.
USPC ............................................. 55/498; 55/502

(58) Field of Classification Search
None
See application file for complete search history.

(56) References Cited

U.S. PATENT DOCUMENTS

| 5,211,846 | A | * | 5/1993 | Kott et al. ...................... 210/232 |
| 5,484,466 | A | | 1/1996 | Brown et al. |
| 5,725,621 | A | * | 3/1998 | Pruette et al. .................... 55/377 |
| 5,736,045 | A | * | 4/1998 | Bies et al. ................ 210/497.01 |
| 5,961,678 | A | | 10/1999 | Pruette et al. |
| 7,267,706 | B2 | * | 9/2007 | Schaerlund et al. ............ 55/492 |
| 7,531,090 | B1 | * | 5/2009 | Stamey et al. ................ 210/234 |
| 2002/0112459 | A1 | | 8/2002 | Andress et al. |
| 2003/0146149 | A1 | | 8/2003 | Binder et al. |
| 2005/0061292 | A1 | | 3/2005 | Prellwitz et al. |
| 2006/0049096 | A1 | * | 3/2006 | Bassett et al. ................. 210/337 |
| 2006/0157403 | A1 | * | 7/2006 | Harder et al. ................. 210/445 |
| 2011/0000174 | A1 | | 1/2011 | Kapelarie et al. |

FOREIGN PATENT DOCUMENTS

| DE | 19930614 A1 | 1/2001 |
| DE | 10159097 A1 | 6/2003 |
| DE | 102005025192 A | 12/2005 |
| DE | 102007017091 A1 | 10/2008 |
| EP | 1306117 A1 | 5/2003 |

OTHER PUBLICATIONS

English abstract for DE-102005025192.
EP Search Report for EP-11153155.

* cited by examiner

*Primary Examiner* — Duane Smith
*Assistant Examiner* — Phillip Shao
(74) *Attorney, Agent, or Firm* — Rader, Fishman & Grauer PLLC

(57) ABSTRACT

A filter element may include an annular filter body and an internal support frame. The filter body may be supported radially on the inside of the internal support frame. At least one end disk may be disposed at the filter body and the internal support frame. The end disk may have a central disk opening and a radial seal arranged coaxially to the disk opening. The internal support frame may have a plurality of radial centering elements distributed in the circumferential direction. The frame may be projected inwardly and extends to a radial end on the inside at an inner wall of the end disk. The inner wall may enclose the disk opening.

20 Claims, 2 Drawing Sheets

FILTER ELEMENT AND FILTER DEVICE

CROSS-REFERENCES TO RELATED APPLICATION

This application claims priority to German patent application DE 10 2010 009 268.1 filed on Feb. 25, 2010, which is hereby incorporated by reference in its entirety.

TECHNICAL FIELD

The present invention relates to a filter element, in particular for an air filter of a fresh air system of a vehicle or an internal combustion engine. Moreover, the invention relates to a filter device, in particular an air filter for a fresh air system of a motor vehicle or an internal combustion engine which is equipped with at least one such filter element.

BACKGROUND

From DE 101 59 097, a filter device is known which contains a filter element within a filter housing. The filter element has an annular filter body made from a filter material and an internal support frame at which the filter body is supported radially on the inside. Furthermore, the filter element has two end disks which are arranged axially on opposing sides on the filter body and on the internal support frame. Both end disks each have one central disk opening. In the disk opening of the one end disk, a nozzle of a primary outlet can be inserted. In the disk opening of the other end disk, a flange is fixedly integrated which has a nozzle that can be fluidically connected to a secondary outlet.

From DE 10 2007 017 091 A1, a filter element is known which has an annular filter body made from a filter material and has an internal support frame. An end disk made from a sealing material is axially injection molded on the filter body and the internal support frame in such a manner that the internal support frame is not covered radially on the inside by the sealing material of the end disk. In fact, the end disk and the internal support frame are flush with each other radially on the inside.

From DE 81 29 527 U1, a further filter element is known which has an annular filter body, an internal support frame and at least one end disk which is axially connected to the filter body and the internal support frame. The integration of internal support frame and end disk can take place in such a manner that the internal support frame defines an axial limit stop for the filter element. For this, the internal support frame extends on the front side through the end disk up to a front-side surface of the end disk with which the internal support frame is flush.

The problem of such filter elements or filter devices is the gas-tight connection between the inner space enclosed by the filter body and a port on the housing side through or via the respective end disk. If a nozzle is inserted through the disk opening of the respective end disk, an opening edge surrounding the disk opening can rest in a radially sealing manner against the respective nozzle. Thereby, a positioning of the filter element at the filter housing is achieved at the same time. However, it was found that during operation, in particular during vehicle operation, shocks or vibrations occur which result in relative movements between filter element and filter housing, whereby the connection between filter element and filter housing is subjected to high loads. This can result in increased wear of the filter element in the region of the end disk. In particular, the sealing effect between end disk and nozzle can decrease.

SUMMARY

The present invention is concerned with the problem to provide an improved embodiment for a filter element or a filter device equipped therewith, which embodiment is in particular characterized in that the positioning of the filter element in the filter housing is improved and/or that the risk of wear of the filter element is reduced and/or that the sealing effect between the respective end disk of the filter element and the respective nozzle of the filter housing is improved.

This problem is solved according to the invention by the subject matters of the independent claim. Advantageous embodiments are subject matters of the dependent claims.

The invention is based on the general idea, on the one hand, to equip the end disk with a radial seal arranged coaxially to the disk opening and, on the other, to provide the internal support frame with a plurality of radial centering elements which project inwards and are arranged distributed in the circumferential direction. Said centering elements end radially on the inside at an inner wall of the end disk, which inner wall encloses the disk opening. Accordingly, the radial centering elements are embedded flush radially on the inside into the inner wall of the end disk. The design proposed here results in a functional separation of the sealing effect achievable by means of the radial seal from the centering effect achievable by means of the radial centering elements. Hereby, said functions are decoupled from each other, whereby the effectiveness of the individual functionality can be improved. The centering of the filter element in the region of the end disk is carried out via the radial centering elements, thus via the internal support frame which usually consists of a frame material, the stiffness of which is higher than the stiffness of the disk material or the filter material. This results in a stable, centered support of the internal support frame via its radial centering elements and thus a support of the filter element in the region of the associated end disk on the respective nozzle on the housing side, which nozzle is inserted in the disk opening of said end disk. In contrast to this, the radial seal advantageously consists of a sealing material or a disk material if the radial seal is integrally formed on the end disk. The sealing material is comparatively elastic or flexurally soft, in any case softer than the frame material and thus can achieve the desired sealing function. In particular, the radial seal can be elastically stretched during the insertion of the respective nozzle so that the radial seal finally rests under radial preload in a radially sealing manner against the respective nozzle.

The proposed design results in a significant reduction of the component load which reduces the risk of damage. At the same time, the sealing effect is improved.

According to a preferred embodiment, the internal support frame has a support frame opening arranged coaxially to the disk opening, wherein the radial centering elements can extend in the region of said support frame opening. Particularly advantageous is an embodiment in which the internal support frame has an inner edge which encloses the aforementioned support frame opening and from which the radial centering elements extend. Hereby, a star-shaped arrangement of the radial centering elements is simplified.

Particularly advantageous is an embodiment in which the internal support frame has a disk-shaped, axial end section which includes the support frame opening in the center. Due to the disk-shaped axial end section, the internal support frame has a significantly increased stability in the region of the end disk, whereby it is in particular possible to shift a support function from the end disk to the internal support frame. Hereby, the manufacture of the end disk from a sealing material, in particular from a foam material, is simplified which improves the sealing function of the end disk. The sealing function of the end disk relates, on the one hand, to the axial sealing of the filter material of the filter body. On the other, optionally, it can also refer to the implementation of the radial seal.

In a particularly advantageous embodiment, a nozzle receptacle for axially inserting the nozzle can be formed on the end disk. Said nozzle receptacle can form the disk opening and can comprise the inner wall as well as the radial seal. Advantageously, said nozzle receptacle can be integrally formed on the end disk. To be able to further improve or stabilize the positioning of the filter element in the filter housing, the internal support frame can optionally comprise a plurality of axial outwardly projecting centering elements which end axially on the outside at an outer side of the end disk.

The radial centering elements and/or the axial centering elements can preferably be embedded to a large extent into the end disk. Advantageously, they are substantially completely embedded into the end disk. Particularly advantageous is an embodiment in which the respective centering element is only visible through its front end located distally with respect to the remaining internal support frame or is not covered by the disk material and runs or ends there in particular flush with the end disk.

The radial centering elements have a radial dimension with respect to a longitudinal center axis of the filter element. Particularly advantageous is an embodiment in which the radial centering elements extend radially inwardly with respect to the longitudinal center axis of the filter element. The same applies also for the axial centering elements which have an axial dimension running parallel to the longitudinal axis of the filter element. However, preferred is an embodiment in which the axial centering elements extend axially so that they run parallel to the longitudinal axis of the filter element.

By means of a cover for closing the receiving chamber, which cover has a nozzle which also interacts with an end disk of the filter element, an assembly aid and centering aid can be provided for the filter element.

Further important features and advantages of the invention arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the context of the present invention.

Preferred exemplary embodiments of the invention are illustrated in the drawings and are explained in the following description in more detail, wherein identical reference numbers refer to identical, or similar, or functionally identical components.

DETAILED DESCRIPTION

Figure 1:
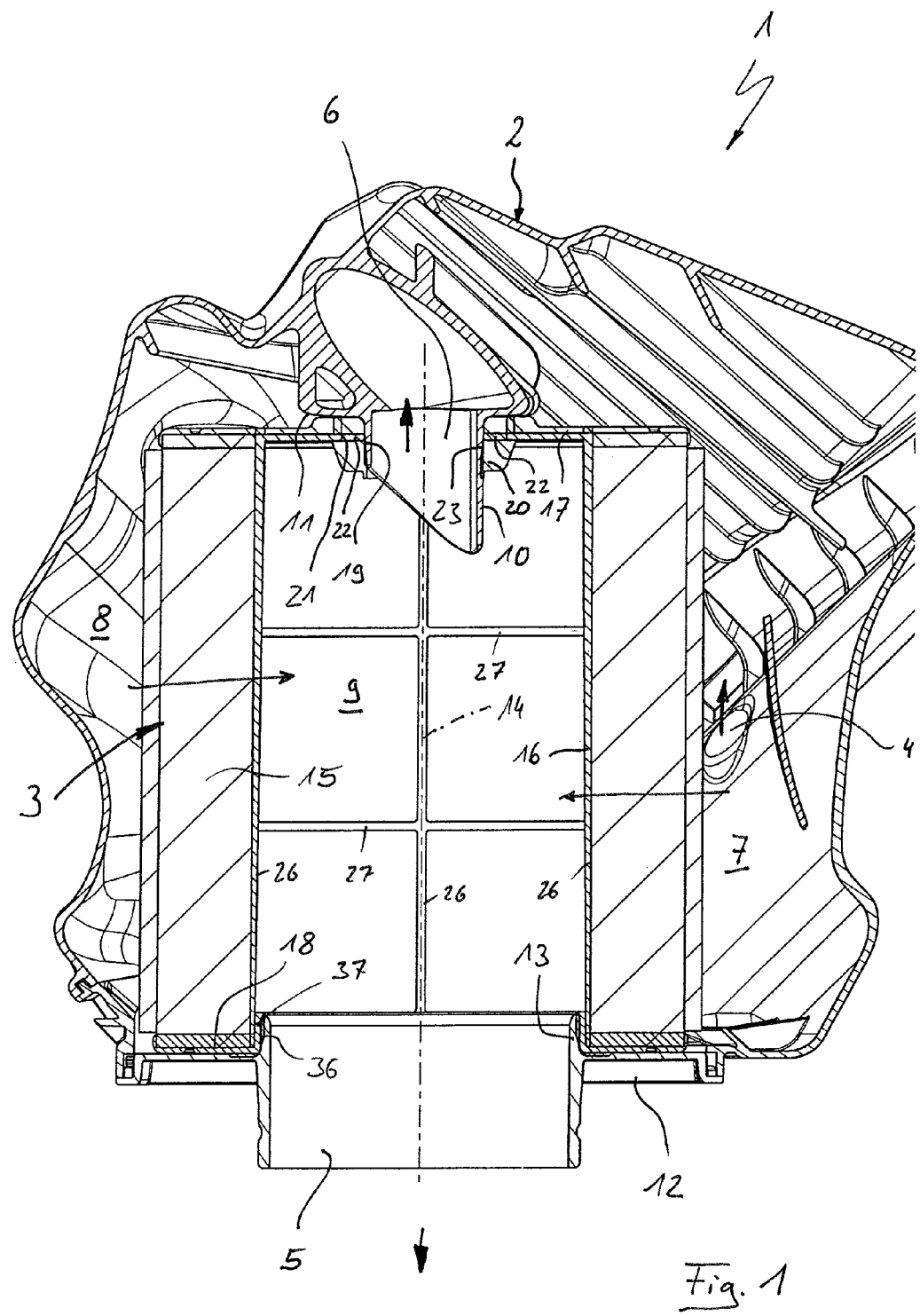
FIG. 1 shows a longitudinal section through a filter device in the region of a filter element.

According to FIG. 1, the filter device 1 comprises a filter housing 2 and a filter element 3 arranged therein. The filter device 1 is preferably configured as air filter of a fresh air system by means of which fresh air can be supplied to a motor vehicle or a vehicle interior or preferably to an internal combustion engine. In this case, the filter element 3 involves an air filter element.

The filter housing 2 has an inlet 4, a primary outlet 5 and a secondary outlet 6. Furthermore, the filter housing 2 encloses a receiving chamber 7 in which the filter element 3 is arranged. In the filter housing 2 or in the receiving chamber 7, the filter element 3 separates a crude chamber 8 communicating with the inlet 4 from a pure chamber 9 communicating with the two outlets 5, 6. In the example, the flow runs from the outside inwardly through the filter element 3 so that the filter element 3 encloses the pure chamber 9 and, for its part, is enclosed by the crude chamber 8.

The secondary outlet 6 has a nozzle 10 which is arranged at a bottom 11 of the receiving chamber 7 or the filter housing 2. The receiving chamber 7 can be closed with a cover 12 of the filter housing 2. The primary outlet 5 is formed on said cover 12. In this case, the primary outlet 5 also comprises a nozzle 13 which here is integrally formed on the cover 12. The two outlets 5, 6 are axially opposing each other. In particular, they are arranged coaxially to each other. The reference axis is formed here by the longitudinal center axis 14 of the filter element 3. Advantageously, the filter element 3 is detachably connected, e.g. clipped or latched, with the cover 12. In any case, this connection is preferably configured in such a manner that the filter element 3 is moved out of the receiving chamber 7 when removing the cover 12 from the housing 2. In other words, the filter element 3 can be pulled out of the filter housing 2 together with the cover 12. This makes the disassembly easier. Analog to this, the disassembly can also be simplified if the filter element 3 is connected to the cover 12 and can be inserted in this manner into the filter housing 2. Due to the mounting of the filter element 3 on the cover 12, a positioning in the filter housing 2 takes place whereby an axial canting or tilting of the filter element 3 during assembly is prevented.

The filter element 3 has an annular filter body 15 which consists of a filter material and extends coaxially with respect to the longitudinal center axis 14. The filter material can in particular be folded or pleated.

Moreover, the filter element 3 has an internal support frame 16 on which the filter body 15 is supported radially on the inside. The radial direction relates here to the longitudinal center axis 14. The internal support frame 16 consists of a support frame material which has a considerably higher stability than the filter material.

Furthermore, the filter element 3 has at least one end disk 17, 18. In the example, two end disks 17, 18 are provided which are arranged on the filter element's 3 two front sides axially facing away from each other. Accordingly, the one end disk 17 is associated with the secondary outlet 6 while the other end disk 18 is associated with the primary outlet 5.

The end disk 17 associated with the secondary outlet 6 is explained in more detail hereinafter by means of the FIGS. 2 and 3. Said end disk 17 has a central disk opening 19 through which the nozzle 10 of the secondary outlet 6 can be inserted. Coaxially to said disk opening 19, the respective end disk 17 has a radial seal 20 which, in the assembled state, rests radially on the outside against the nozzle 10 in a radially sealing manner.

The internal support frame 16 has a support frame opening 21 which is arranged coaxially to the disk opening 19. Further, the internal support frame 16 has a plurality of centering elements 22 which project inwardly and are arranged distributed in the circumferential direction. The circumferential direction too relates to the longitudinal center plane 14 here. Said radial centering elements 22 end radially on the inside at an inner wall 23 of the end disk 17, wherein said inner wall 23 encloses the disk opening 19.

The support frame opening 21 is enclosed by an inner edge 24 of the internal support frame 16. The radial centering elements 22 extend from said inner edge 24. In the shown example, the radial centering elements 22 extend exactly radially, thus star-shaped, to the longitudinal center axis 14. However, in another embodiment, they could also be inclined or arranged obliquely with respect to said exact radial alignment. Also, they could have an axial component in their alignment.

Advantageously, the internal support frame 16 has a disk-shaped axial end section 25 which can also be designated hereinafter as disk section 25. The disk section 25 has a central support frame opening 21. Thus, its inner side forms the inner edge 21. Radially on the outside, the disk section 25 ends at the filter body 15. Accordingly, the disk section 25 ends radially on the outside at the filter body 15. In the region of the outer side of the disk section 25, axial ribs 26 of the internal support frame 16 extend, which axial ribs are connected to each other according to FIG. 1 via rings or ring segments 27.

At the end disk 17 associated with the secondary outlet 6, moreover, a nozzle receptacle 28 is formed which serves for axially inserting the nozzle 10. Advantageously, said nozzle receptacle 28 is integrally formed on the end disk 17. Here, the nozzle receptacle 28 forms the disk opening 19 and thus comprises also the inner wall 23 as well as the radial seal 20. Said radial seal 20 has advantageously at least one radially acting sealing contour 29, e.g. in the form of an annularly closed, continuous circumferential edge projecting radially inwards. At this sealing contour 29, ultimately, the radial contact with the inserted nozzle 10 and the sealing effect take place. Said sealing contour 29 is arranged axially spaced apart from the radial centering elements 22. In particular, the sealing contour 29 is arranged shifted axially inwardly with respect to the centering elements 22, thus shifted into the filter element's 3 interior enclosed by the filter body 15. Hereby, in addition, a spatial decoupling between the sealing function obtained with the radial seal 20 and the centering function generated by means of the radial centering elements 22 is achieved.

Figure 2:
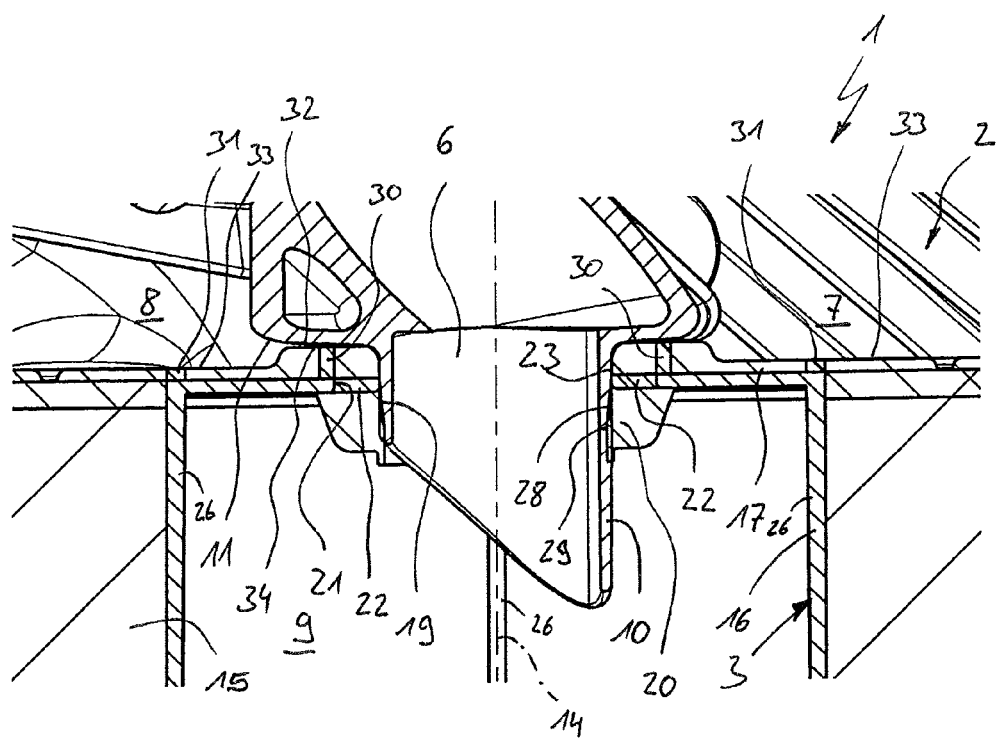
FIG. 2 shows an enlarged detail from FIG. 1 in the region of an end disk of the filter element.

According to FIG. 2, the internal support frame can also comprise a plurality of axial centering elements 30, 31. Said axial centering elements 30, 31 too are arranged distributed in the circumferential direction and end axially on the outside at an outer side 32 and 33, respectively, of the end disk 17. Here too, in the region of the secondary outlet 6 associated with the end disk 17, said axial centering elements 30, 31 are formed, in particular integrally formed, on the internal support frame 16. In the example, internal axial centering elements 30 and external axial centering elements 31 are provided so that the internal axial centering elements 30 are arranged further inwards in the radial direction than the external axial centering elements 31. In particular, the internal axial centering elements 30 are arranged at the internal support frame 16 in such a manner that they project outwardly in the region of the inner edge 21 from which also the radial centering elements 22 project inwardly. Further, in the example, the external axial centering elements 31 are positioned on the internal support frame 16 in such a manner that they project outwardly in the region of the filter body 15, thus approximately in the region of the axial ribs 26.

For the axial centering elements 30, 31 too, an axial alignment is preferred so that they project from the internal support frame 16 and parallel to the longitudinal center axis 14. However, alignments inclined with respect to the axial direction are principally also possible for the axial centering elements 30, 31.

In the embodiments shown here, the centering elements 22, 30, 31 are embedded to a large extent into the respective end disk 17. In other words, they are completely or almost completely enclosed by the disk material. Preferably, the centering elements 22, 30, 31 are enclosed by the disk material to such an extent that only their respective radial or axial front side, which faces away from the remaining internal support frame 16, is not covered by the disk material. Thus, the centering elements 22, 30, 31 end distally to the internal support frame 16 and in each case flush with the end disk 17.

The internal axial centering elements 30 can define an axial limit stop which can interact with an annular step 34 formed at the bottom 11 at the transition to the nozzle 10 in order to position the filter element 3 when attaching it onto the nozzle 10. At the same time, an undesired squeezing of the disk material at the bottom 11 can be prevented. The external axial centering elements 31 can also serve as limit stop with respect to a suitable inner contour of the filter housing 2.

Figure 3:
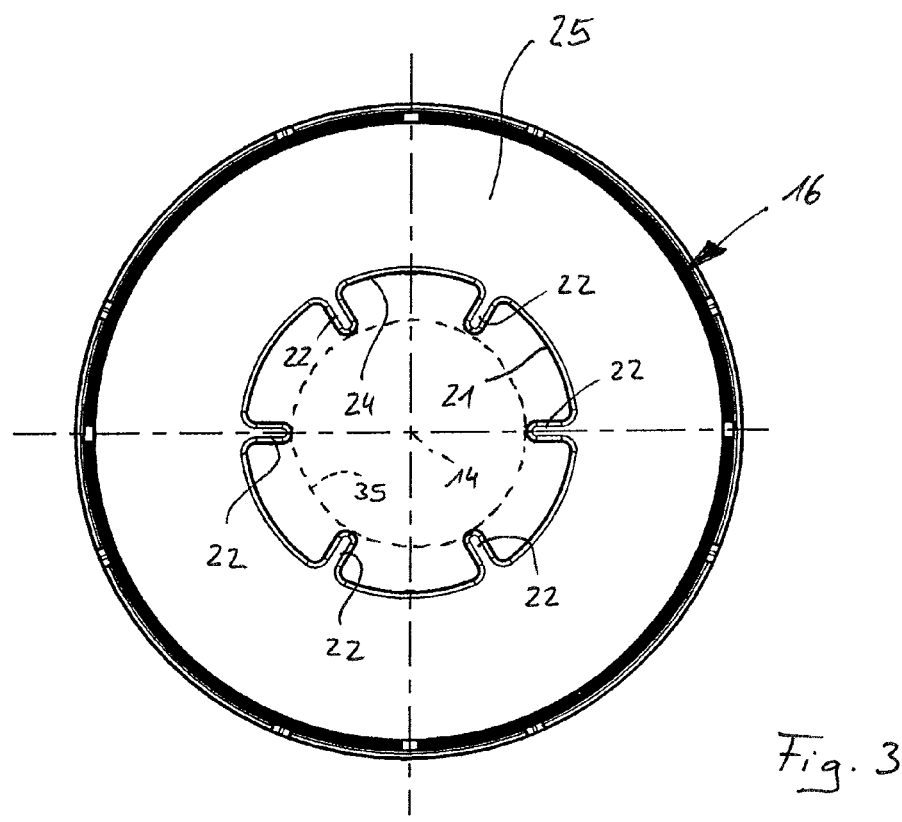
FIG. 3 shows an axial view of an internal support frame of the filter element.

According to FIG. 3, the radial centering elements 22 can end radially on the inside at a common centering circle 35. The centering circle 35 is arranged coaxially to the longitudinal center axis 14 and thus coaxially to the support frame opening 21. In connection with a nozzle 10 which has a circular-cylindrical outer contour, thus, an optimal centering of the filter element 3 relative to the nozzle 10 can be implemented by means of the radial centering elements 22.

In the relaxed state, thus, when the nozzle 10 is not inserted in the radial seal, the radial seal 22 defines in particular with its sealing contour 29 an inner circle which is not described in detail here and which is smaller than the centering circle 35. Hereby is achieved that the radial seal 20 is widened during the insertion of the nozzle 10. This takes place elastically and generates an inwardly acting preload by means of which the radial seal 20 rests radially against the outer contour of the nozzle 10, in particular in the region of sealing contour 29 of the seal.

In a particularly advantageous embodiment, the end disk 17 is injection molded or foamed onto the filter body 15 and the internal support frame 16. In this manner, additional fastening measures can be eliminated. For foaming, e.g. PU foam can be used as disk material. For foaming and injection molding, in particular sealing materials are suitable, whereby the sealing effect of the end disk 17 is improved in the region of the filter body 15 and in the region of the radial seal 20.

According to FIG. 1, the end disk 18 associated to the primary outlet 5 has also a central disk opening 36 which, however, is dimensioned significantly larger than the disk opening 19 of the opposing end disk 17. The nozzle 13 on the primary side penetrates into said disk opening 36. For this, the end disk 18 can also be equipped with a nozzle receptacle 37 on which, in addition, a sealing contour for generating a radial sealing can be formed. Said end disk 18 too is advantageously injection molded or foamed onto the filter body 15 and the internal supporting frame 16. By the positioning of the filter element 3 with its end disks 17, 18 at the two nozzles 10, 13, the filter element 3 is radially centered at the bottom 11 and the cover 12 in the filter housing 2.

The invention claimed is:
1. A filter element comprising:
   an annular filter body made of a filter material,
   an internal support frame, wherein said filter body is supported radially on the inside by said internal support frame, at least one end disk disposed at the filter body and the internal support frame, wherein the end disk has a central disk opening and a radial seal arranged coaxially to the disk opening, wherein the end disk has an outer diameter that terminates at an inner side of the annular filter body, wherein the internal support frame has a plurality of radial centering elements distributed in the circumferential direction and projected inwardly and extending to a radial end on the inside at an inner wall of the end disk, wherein the inner wall encloses the disk opening, wherein the centering elements are surrounded radially by the end disk, and extend to define an inner centering circle.

2. The filter element according to claim 1, wherein the internal support frame has a support frame opening arranged coaxially to the disk opening, wherein the radial centering elements extend from an inner edge of the internal support frame, the inner edge enclosing the support frame opening.

3. The filter element according to claim 2, wherein the internal support frame has a disk-shaped axial end section, the support frame opening being included in the center of the end section, wherein the disk-shaped end section extends to a radial end at the outside of the filter body.

4. The filter element according to claim 1, further comprising a nozzle receptacle formed on the end disk for receiving a nozzle, wherein the nozzle receptacle forms the disk opening and includes the inner wall and the radial seal.

5. The filter element according to claim 1, wherein the internal support frame has a plurality of axial centering elements, each extending outwardly and axially from the outside of the end disk.

6. The filter element according to claim 5, wherein the internal support frame has a plurality of internal axial centering elements, each extending outwardly from an inner edge of the internal support frame; and wherein the internal support frame has external axial centering elements, each extending outwardly from the filter body.

7. The filter element according to claim 5, wherein at least one of (i) the radial centering elements extends radially inwardly from the internal support frame, (ii) the axial centering elements extend axially outwards from the internal support frame, and (iii) the end disk is injection molded-onto the filter body and the internal support frame.

8. The filter element according to claim 1, wherein the radial seal has at least one radially acting sealing contour arranged axially inwardly with respect to the radial centering elements.

9. The filter element according to claim 1, wherein the centering circle is arranged coaxially to the support frame opening, and wherein the radial seal defines an inner circle, the inner circle being smaller than the centering circle.

10. The filter element according to claim 2, further comprising a nozzle receptacle formed on the end disk for receiving a nozzle, wherein the nozzle receptacle forms the disk opening and includes the inner wall and the radial seal.

11. The filter element according to claim 2, wherein the internal support frame has a plurality of axial centering elements, each extending outwardly and axially from the outside of the end disk.

12. The filter element according to claim 11, wherein the internal support frame has a plurality of internal axial centering elements, each extending outwardly from an inner edge of the internal support frame, wherein the internal support frame has external axial centering elements, each extending outwardly from the filter body.

13. The filter element according to claim 11, wherein at least one of (i) the radial centering elements extends radially inwardly from the internal support frame, (ii) the axial centering elements extend axially outwards from the internal support frame, and (iii) the end disk is injection molded onto the filter body and the internal support frame.

14. The filter element according to claim 11, wherein at least one of (i) the radial centering elements extends radially inwardly from the internal support frame, (ii) the axial centering elements extend axially outwards from the internal support frame, and (iii) the end disk is foamed onto the filter body and the internal support frame.

15. The filter element according to claim 2, wherein the centering elements are embedded into the end disk, and wherein a respective centering element ends distally at the internal support frame and flush with the end disk.

16. The filter element according to claim 2, wherein the radial seal has at least one radially acting sealing contour arranged axially inwardly with respect to the radial centering elements.

17. The filter element according to claim 2, wherein the radial centering elements extend to a radial end at a common centering circle, the common centering circle arranged coaxially to the support frame opening, and wherein the radial seal defines an inner circle, the inner circle being smaller than the centering circle.

18. A filter element comprising:

an annular filter body made of a filter material, an internal support frame, wherein said filter body is supported radially on the inside by said internal support frame, at least one end disk disposed at the filter body and the internal support frame, wherein the end disk has a central disk opening and a radial seal arranged coaxially to the disk opening, wherein the end disk has an outer diameter that terminates at an inner side of the annular filter body, wherein the internal support frame has a plurality of radial centering elements distributed in the circumferential direction that define an inner centering space for the filter body and wherein the centering elements are radially surrounded by the end disk.

19. The filter element according to claim 1, wherein the internal support frame includes a plurality of axial ribs extend from an outer side of the end disk.

20. The filter element according to claim 18, wherein each of the radial centering elements is an undulation formed in the internal support frame.

* * * * *